Patented Aug. 18, 1931

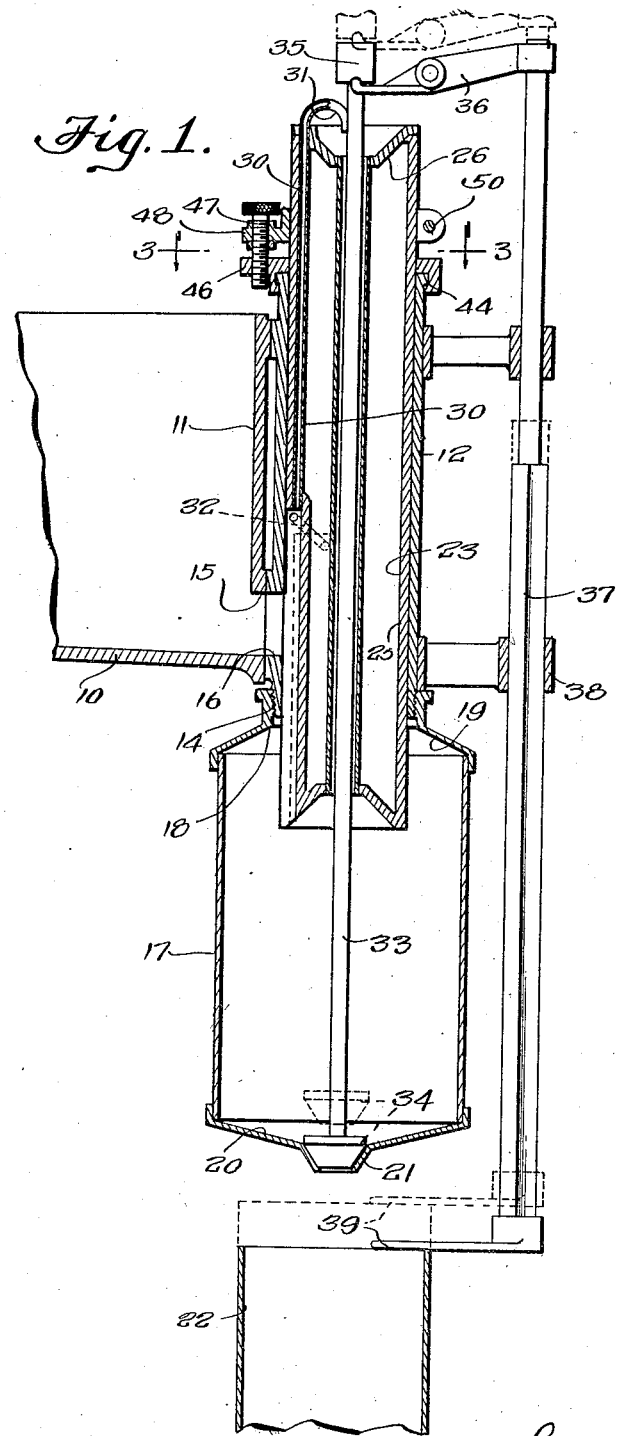

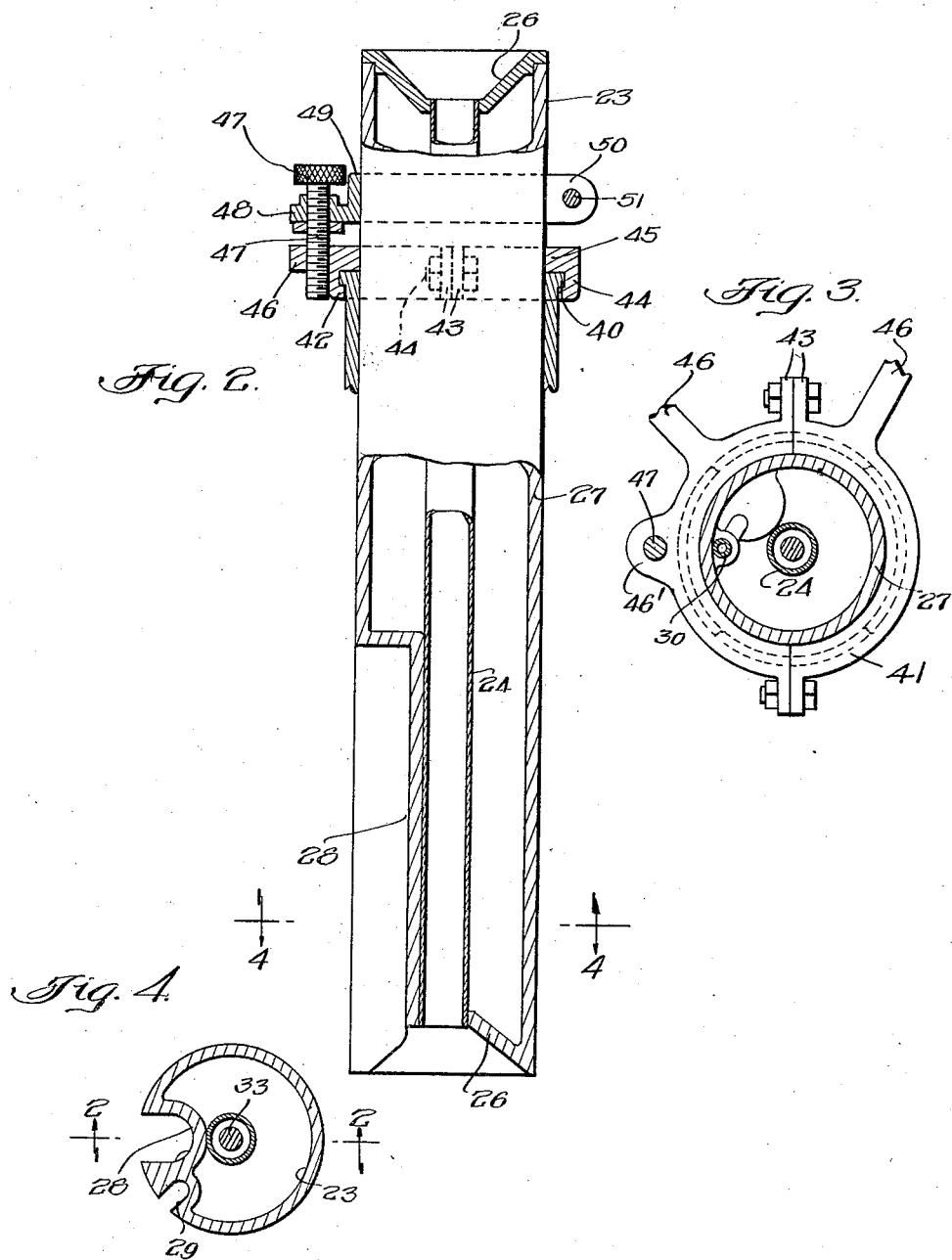

1,819,361

UNITED STATES PATENT OFFICE

LEE W. DUER, OF ELGIN, ILLINOIS, ASSIGNOR TO ELGIN MANUFACTURING COMPANY, OF ELGIN, ILLINOIS, A CORPORATION OF ILLINOIS

MEASURING DEVICE FOR FILLING MACHINES

Application filed September 17, 1929. Serial No. 393,235.

This invention relates to measuring devices for filling machines.

An object of the invention is to provide a combined valve and measuring device for use in filling machines wherein the material to be dispensed is tapped from a supply reservoir and measured to conform to a given size receptacle, and then emptied into said receptacle.

Another object of the invention is to provide an improved device of the character referred to wherein a displacement element is employed for varying the capacity of the measuring container, provision being made so that different sizes of measuring containers may be utilized with the constant size displacement element, means being provided for venting any air which may be trapped in the container, and for aiding in the rapid and smooth flow of the material.

Still another object of the invention is to provide means for quickly adjusting the displacement element to vary the size of the measuring container used, and also to provide means for obtaining a very fine adjustment of the capacity of the measuring container, all without interfering in any way with the normal operation of the device as a valve.

A still further object of the invention is to provide a device of the type indicated which is mounted exteriorly of the supply reservoir, thereby doing away with difficulties of operation which hitherto have existed due to the mounting of the measuring devices within the supply reservoir.

Other and further objects of the invention will appear from the specification and claims hereinafter following.

In the drawings forming a part of this specification Fig. 1 is a vertical sectional view of the invention, illustrating a fragment of the reservoir and operating mechanisms, in connection with which the measuring device is employed. Fig. 2 is an enlarged vertical sectional view through the displacement device corresponding to line 2—2 of Fig. 4, and showing a fragment of the supporting casing associated therewith. Fig. 3 is an enlarged transverse sectional view corresponding to the line 3—3 of Fig. 1. And Fig. 4 is an enlarged transverse sectional view corresponding to the line 4—4 of Fig. 2.

The invention hereinafter described is intended principally as an improvement over the valve measuring means disclosed in a patent granted to L. A. Baker, No. 1,036,778 dated August 27, 1912, and it is not deemed necessary to show or describe the actuating mechanism of the filling machine, except so much as is required for an understanding of the improved device. Although designed especially for use in connection with a machine of a type shown in the patent, it of course will be understood that the device can be employed in any other situation where it would prove useful.

As shown in the drawings, a main reservoir is provided, a fragment of which is shown in Fig. 1 and indicated by the reference character 10. This reservoir is adapted to contain the principal supply of fluid, to be dispensed through the medium of a plurality of dispensing devices, only one of which is shown in the drawings. Secured to the side wall 11 of the main reservoir 10, by any suitable means, such as brackets, is a cylindrical casing 12, the upper end of the casing terminating somewhat above the upper end of the reservoir 10 as indicated at 13, while the lower end of the casing extends somewhat below the bottom wall of the reservoir 10, the lower portion being threaded as indicated at 14, for the detachable reception of measuring containers of various sizes as hereinafter referred to. The side wall 11 of the reservoir 10 is provided with a port 15 and the cylindrical casing 12 is likewise provided with a port 16, these ports affording a permanent communication of the reservoir 10 with the interior of the cylindrical casing 12.

Detachably connected with the threaded end 14 of the cylindrical casing is a measuring container 17, which may be either larger or smaller than the type shown, as desired, the container preferably having a threaded nipple 18 for detachable engagement with the threaded end 14 of the lower end of the casing 12. The upper end of the container preferably is conical in form providing the top wall 19 which is connected to the nipple 18, and the bottom wall 20 of the container preferably is of inverted conical form. The bottom wall 20, at a central point, is provided with a conical valve seat 21 adapted to cooperate with a valve as hereinfter described. The valve seat 21 provides an opening disposed in line with a receptacle to be filled, such receptacle being indicated at 22.

Rotatably mounted in the cylindrical casing 12 is a combined valve and displacement member 23, best shown in Figs. 1 and 2. The displacement member preferably consists of a generally cylindrical double walled formation, comprising an inner tubular wall or portion 24, defining a cavity extending longitudinally entirely through the displacement member, and an outer cylindrical wall 25 surrounding and spaced from said inner wall. The opposite ends of the tubular wall 24 are connected with the outer wall 25 by means of oppositely disposed conical end walls 26 and 27. Formed in the outer wall 25 of the displacement member is a longitudinally extending groove or channel 28 which in one position is adapted to communicate with the ports 15 and 16 in the reservoir and casing respectively. At one side of the channel 28 there is provided a second channel 29, the latter channel extending longitudinally along one side of the displacement member, communicating at its bottom with the container 17, and at its upper end communicating with a pipe 30 which extends upwardly between the inner and outer walls of the displacement member and through the top wall 26, and terminates in a downwardly turned spout portion 31, the outlet end of which is adapted to discharge into the opening provided by the tubular member 24. Communication of the channel 29 and of the channel 28 is effected by means of a duct 32 connecting the two channels, as best shown in Figs. 1 and 2.

Loosely extending through the tubular portion 24 of the displacement member is a valve rod 33, said rod at its lower end being provided with a conical valve 34 adapted to cooperate with the valve seat 21 for opening and closing the valve opening when the valve rod is reciprocated. The valve rod 33 extends entirely through the tubular portion 24 and projects upwardly beyond the upper end of the displacement member, being provided at its upper extremity with a head 35 beneath which is adapted to engage an end portion of an operating arm 36 carried by a reciprocating rod 37 mounted in suitable brackets 38 affixed to the casing 12, the lower end of the rod being provided with a shoe 39 adapted to be engaged and lifted by the receptacle 22 when the latter is placed in position to be filled, this occurring in timed relation in the manner illustrated in the patent heretofore referred to.

The displacement member 23 is mounted for rotation and longitudinal adjustment with respect to the casing 12. This is accomplished by providing the upper end of the casing 12 with arcuate flanges 40 adapted to cooperate with a supporting ring 41. The ring 41 is provided with spaced inturned lugs 42 adapted to be inserted between the ends of the arcuate flanges 40 and engaged beneath said flanges so as to be rotatably mounted with respect to the casing 12. As stated the ring 41 is of the split type having laterally extending ears 43 apertured to receive a clamping bolt 44. The ring 41 is also provided with an upwardly extending flange 45 adapted to be tightly clamped to the displacement member 23 when the ring 41 is drawn up, it being understood that the lugs 42 of the ring are so proportioned that they do not bind upon the casing or the flanges 40 when the ring is tightened. The ring 41 is further provided with spaced radially extending arms 46—46 adapted to project into the path of operating mechanism such as that shown in the Baker Patent heretofore referred to, said mechanism serving to oscillate the ring 41, and the displacement element, in timed relation with reference to the valve mechanism as will be understood. The ring 41 is further provided with a lip 46' adapted for the threaded reception of the lower end of a set-screw 47, the upper end of the set-screw being threaded in a lip 48 projecting laterally from a second clamping ring 49. The latter clamping ring is also of the split type having extended ears 50 and a clamping bolt 51, by means of which the ring may be clamped tightly to the displacement member.

In use a measuring container 17 of the desired size is selected and attached to the threaded end of the casing 12. The displacement element is then vertically adjusted so as to project the required distance into the container to displace a portion of the space therein, and determine the quantity of material according to the amount it is desired to deliver from the container when the valve mechanism is operating. Adjustment of the displacement member may be effected by varying the position of said member with respect to the clamping rings 41 and 49. For a rough or approximate adjustment both of these rings are loosened to free the displacement member which then may be shifted vertically to the desired position. The ring 49 may then be tightened. Finer adjustment of the position of the displacement member may be effected by moving the ring 49 and the displacement member with reference to the ring 41, through manipulation of the set-screw 47. After the fine adjustment is made the ring 41 is drawn up tight also engaging the displacement member. At any time during the operation of the machine a very fine adjustment can be obtained merely by loosening up the ring 41 and manipulating the set-screw 47.

As above pointed out the ring 41 also carries operating arms 46—46 by means of which the displacement member is oscillated. When said member is oscillated to bring about registry of the channel 28 with the ports 15 and 16 of the reservoir 10 and casing 12 respectively, fluid will flow from the reservoir and through the channel 28 into the container 17, the flow continuing until the container 17 is entirely filled. During this operation any air which is trapped in the container 17 must be vented therefrom to permit complete filling of the receptacle. The trapped air passes upwardly around the valve stem 33 due to the loose fit of the same with the tubular portion of the displacement element; however, because of the projection of the displacement element below the top of the container a quite considerable quantity of the air will be trapped between the sides of the displacement element and the adjacent walls of the container 17. The air is vented through the channel 29 formed in the side wall of the displacement member, such air flowing through the pipe 30 which communicates with the upper end of the channel 29, and being discharged through the downwardly extended spout or nozzle 31 of said pipe. During the passage of the air through the channel 29 and pipe 30 very frequently a portion of the contents of the container 17 is carried along with the air, but any material escaping in this manner will be returned to the container by reason of the same being delivered into the cavity formed by the conical top wall 26 of the displacement member through the medium of the spout 31 of the pipe 30, thence flowing back into the container through the tubular portion 24. A portion of the air escaping through the channel 29 is by-passed into the upper end of the channel 28 by means of the duct 32, thus preventing or retarding the formation of a partial vacuum which would interfere with the rapidity and uniformity of flow of the fluid through the channel 28. When the container 17 has been completely filled the displacement member is oscillated to move the channel portion out of registration with the ports 15 and 16 to close said ports and cut off flow of material to the container 17. The valve stem 33 is then lifted when the receptacle 22 is presented through the movement of the valve operating rod 37, resulting in retraction of the valve 34 from the valve opening 21, and permitting the measured contents of the container 17 to pass into the receptacle 22. Upon continued operation of the machine the valve 34 is again closed, and the described operation is repeated for the next receptacle.

While I have shown and described what I now consider the preferred manner of carrying out my invention the same is merely illustrative and I contemplate all changes and modifications that come within the scope of the claims appended hereto.

I claim:

1. In a device of the character described, the combination with a measuring container; of a displacement element adapted to adjustably extend into said container to vary the capacity thereof, said displacement element being provided with a central hollow tubular portion and an inverted conical portion communicating with said tubular portion; and means for venting air from said container, said means discharging into said conical portion, whereby material carried from said container with the trapped air may be returned to said container through said tubular portion.

2. In a device of the character described, the combination with a measuring container; of a displacement element adapted to adjustably extend into said container to vary the capacity thereof, said displacement element being provided with a central hollow tubular portion and an inverted conical portion communicating with said tubular portion; and means for venting air from said container, said means discharging into said conical portion, whereby material carried from said container with the trapped air may be returned to said container through said tubular portion, and valve means for said container, said valve means including an operating member extending loosely through said central tubular portion of said displacement member.

3. In a device of the character described, the combination with a reservoir; of a measuring container; of a displacement element adjustably extending into said container to vary the capacity thereof, said displacement element being rotatably mounted and provided with a channel adapted to establish communication with said reservoir in one position and cut off said communication in another position; means for venting trapped air from the container, said means communicating with said channel in said displacement member to discharge vented air into said channel.

4. In a device of the character described, the combination with a reservoir having a port; of a measuring container; a displacement element adjustably mounted to extend into said container and vary the capacity thereof, said displacement element being provided with a hollow tubular portion extending centrally therethrough, and being rotatably mounted, said displacement element being provided with an opening adapted in one position to establish communication of said reservoir with said container, and in another position to cut off such communication; means for venting air from said container, said means communicating with the opening in said displacement member to direct trapped air thereinto and to facilitate flow of material into said container.

5. In a device of the character described, the combination with a reservoir having a port; of a measuring container; a displacement element adjustably mounted to extend into said container and vary the capacity thereof, said displacement element being provided with a hollow tubular portion extending centrally therethrough, and being rotatably mounted, said displacement element being provided with an opening adapted in one position to establish communication of said reservoir with said container, and in another position to cut off such communication; means for venting air from said container, said means communicating with the opening in said displacement member to direct trapped air thereinto and to facilitate flow of material into said container, and means extending through said displacement element and communicating with the trapped air of said venting means, and adapted to discharge into said hollow tubular portion of said displacement member.

6. In a device of the character described, the combination with a reservoir; of a measuring container; a combined valve and displacement element for establishing and cutting off communication of said container with said reservoir and for varying the capacity of said container; means for supporting said element for rotation; and means for adjusting said element with reference to said supporting means to vary the position of said element with reference to said container.

7. In a structure of the character described, the combination with a reservoir and a container; of a combined valve and displacement element; means for mounting said element for rotary and axial movement; and means for adjustably shifting said element axially with reference to said mounting.

8. In a device of the character described, the combination with a reservoir having a port; of a measuring container; of a cylindrical displacement element rotatably mounted for establishing and cutting off communication of said reservoir with said container; means for supporting said element for rotation, said means comprising a rotatably mounted split ring adjustably clamped to said element; a second split ring adjustably connected to said element; and a set-screw for adjusting said rings in respect to each other.

9. In a device of the character described, the combination with a reservoir; of a measuring container; a displacement element rotatably mounted for establishing and cutting off communication with respect to said reservoir and container; means for making a rough adjustment of said displacement element with reference to said container; and means for making a fine adjustment of said element with reference to said container.

10. In a mechanism of the character described, the combination of a reservoir having a port; a measuring container, a tubular casing mounted on said reservoir and having a port communicating with said measuring container, a cylindrical displacement element mounted in said casing, said element having means when rotated to establish and cut off communication through said ports with said container; a split ring rotatably supported by said casing; said ring being adjustably clamped to said displacement element; a second ring spaced from said first ring and adjustably clamped to said displacement element; and a set-screw for adjusting said rings with reference to each other.

In witness that I claim the foregoing I have hereunto subscribed my name this 11th day of September 1929.

LEE W. DUER.